United States Patent
Ohno et al.

(10) Patent No.: US 12,216,748 B2
(45) Date of Patent: Feb. 4, 2025

(54) AUTHENTICATION DEVICE, AUTHENTICATION METHOD, AND RECORDING MEDIUM

(71) Applicant: NEC Corporation, Tokyo (JP)

(72) Inventors: Yuki Ohno, Tokyo (JP); Kenji Iida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 246 days.

(21) Appl. No.: 17/797,003

(22) PCT Filed: Feb. 5, 2021

(86) PCT No.: PCT/JP2021/004233
§ 371 (c)(1),
(2) Date: Aug. 2, 2022

(87) PCT Pub. No.: WO2021/157686
PCT Pub. Date: Dec. 8, 2021

(65) Prior Publication Data
US 2023/0059887 A1    Feb. 23, 2023

(30) Foreign Application Priority Data

Feb. 6, 2020  (JP) ................................. 2020-018847

(51) Int. Cl.
*G06F 21/32* (2013.01)

(52) U.S. Cl.
CPC .................................. *G06F 21/32* (2013.01)

(58) Field of Classification Search
None
See application file for complete search history.

(56) References Cited

U.S. PATENT DOCUMENTS

| | | | |
|---|---|---|---|
| 10,671,735 B2 * | 6/2020 | Gupta | G06N 3/02 |
| 10,868,672 B1 * | 12/2020 | Farrugia | H04L 9/0861 |
| 2009/0289760 A1 | 11/2009 | Murakami et al. | |
| 2017/0104861 A1 * | 4/2017 | Kang | G06V 40/172 |
| 2018/0261227 A1 * | 9/2018 | Blouet | G10L 17/08 |
| 2019/0272361 A1 * | 9/2019 | Kursun | H04L 67/535 |
| 2019/0372970 A1 * | 12/2019 | Yan | G10L 17/04 |
| 2020/0042685 A1 * | 2/2020 | Tussy | G06V 40/50 |
| 2020/0342245 A1 * | 10/2020 | Lubin | G06V 40/70 |
| 2021/0153757 A1 * | 5/2021 | Jeon | A61B 5/7257 |
| 2021/0295017 A1 * | 9/2021 | Aoyagi | G06V 30/413 |

FOREIGN PATENT DOCUMENTS

| | | |
|---|---|---|
| JP | 2001-202334 A | 7/2001 |
| JP | 2009-289253 A | 12/2009 |
| JP | 2014-182552 A | 9/2014 |

OTHER PUBLICATIONS

International Search Report for PCT Application No. PCT/JP2021/004233, mailed on Apr. 20, 2021.

* cited by examiner

*Primary Examiner* — Trang T Doan
(74) *Attorney, Agent, or Firm* — Sughrue Mion, PLLC

(57) ABSTRACT

An authentication device includes a comparison unit and a determination unit. The comparison unit compares, with feature value master data for authentication, each feature value needed for authentication that has been extracted from a plurality of pieces of acquired biometric information. The determination unit determines not to provide authentication when, as a result of comparison by the comparison unit, there is no difference in each of the feature values that resulted in a mismatch.

12 Claims, 3 Drawing Sheets

AUTHENTICATION DEVICE, AUTHENTICATION METHOD, AND RECORDING MEDIUM

This application is a National Stage Entry of PCT/JP2021/004233 filed on Feb. 5, 2021, which claims priority from Japanese Patent Application 2020-018847 filed on Feb. 6, 2020, the contents of all of which are incorporated herein by reference, in their entirety.

TECHNICAL FIELD

The present invention relates to an authentication device, an authentication method, and a recording medium.

BACKGROUND ART

As an authentication method, there is biometric authentication using a fingerprint or the like. In biometric authentication, various methods for preventing false authentication due to spoofing have been proposed. Patent Document 1 discloses an authentication method in which collation is performed a plurality of times and a determination is made based on the likelihood of a registered user and the likelihood of being a non-registered user by using a collation score for each of the registered users.

PRIOR ART DOCUMENTS

Patent Documents

Patent Document 1: Japanese Unexamined Patent Application, First Publication No. 2009-289253

SUMMARY OF THE INVENTION

Problems to be Solved by the Invention

As one type of spoofing, it is possible to illegally acquire and use biometric information. In this case, in the above-mentioned authentication method, if the illegally acquired biometric information is used, since the information is the data of the person himself/herself, spoofing cannot be prevented.

Therefore, in view of the above-mentioned problem, an example object of the present invention is to provide an authentication device, an authentication method, and a program for an authentication device that can prevent spoofing even when illegally acquired biometric information is used.

Means for Solving the Problems

According to the first example aspect of the present invention, an authentication device includes: a comparison means that compares, with feature value master data for authentication, each feature value needed for authentication that has been extracted from a plurality of pieces of acquired biometric information; and a determination means that determines not to provide authentication when, as a result of comparison by the comparison means, there is no difference in each of the feature values that resulted in a mismatch.

According to the second example aspect of the present invention, an authentication method executed by a computer includes: a step of comparing, with feature value master data for authentication, each feature value needed for authentication that has been extracted from a plurality of pieces of acquired biometric information; and a step of determining not to provide authentication when, as a result of the comparison, there is no difference in each of the feature values that resulted in a mismatch.

According to the third example aspect of the present invention, a recording medium stores a program for an authentication device that causes a computer to execute: a step of comparing, with feature value master data for authentication, each feature value needed for authentication that has been extracted from a plurality of pieces of acquired biometric information; and a step of determining not to provide authentication when, as a result of the comparison, there is no difference in each of the feature values that resulted in a mismatch.

Effects of the Invention

According to the example embodiment of the present invention, as a result of comparison between each feature value of biometric information pieces acquired several times and the feature value master data for authentication, a determination is made not to authenticate when there is no difference in each of the feature values that resulted in a mismatch. This has the effect of preventing spoofing even when fraudulently acquired biometric authentication data is used.

EXAMPLE EMBODIMENT

Figure 1:
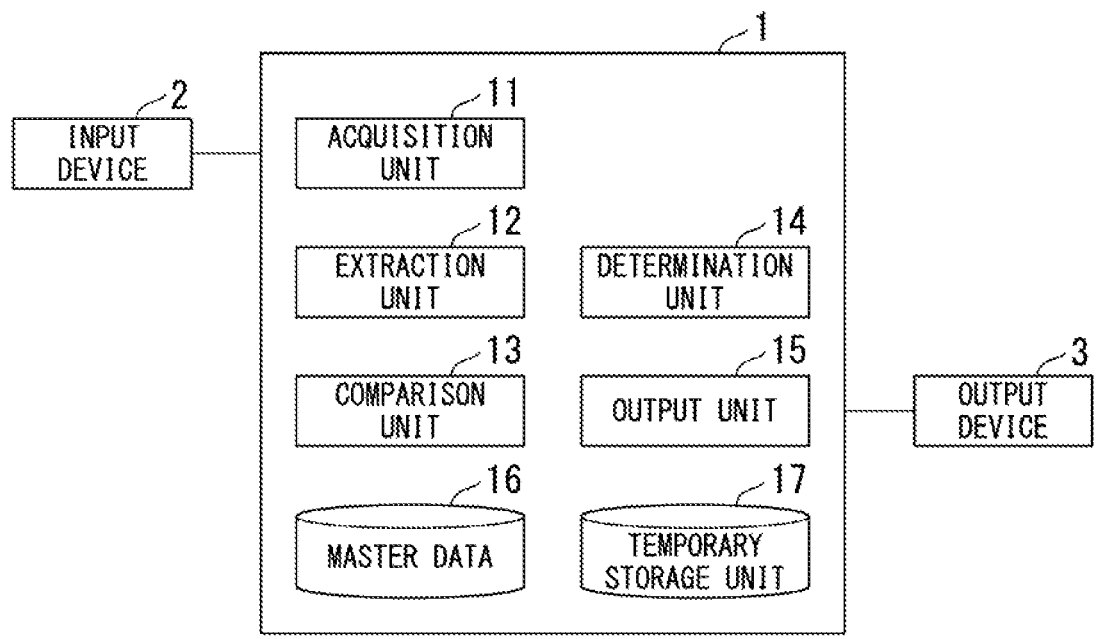
FIG. 1 is a block diagram showing a configuration of the authentication device according to an example embodiment of the present invention.

Hereinbelow, an authentication device according to an example embodiment of the present invention will be described with reference to the drawings. FIG. 1 is a block diagram showing the configuration of the authentication device 1 according to this example embodiment. FIG. 1 shows the authentication device 1, an input device 2, and an output device 3.

The input device 2 is a device for acquiring biometric information of a person seeking authentication. The output device 3 is a device that presents or provides the result of authentication. The output device 3 includes a display device and other service providing devices that use the authentication result. The input device 2 and the output device 3 may be directly connected to the authentication device 1 or may be connected via a network. Moreover, one or both of the input device 2 and the output device 3 may be a part of the authentication device 1.

The authentication device 1 performs authentication using biometric information. The biometric information may include fingerprint information, iris information, face information, voice print information, vein information, and the like. Biological patterns of a fingerprint, iris, face, voiceprint, and veins are possessed by each individual human being, but the patterns has characteristics of being differing from each other. Biometric authentication using biometric information is an authentication method that utilizes such characteristics. The authentication device 1 determines whether or not to provide authentication using the biometric information acquired by the input device 2, and outputs the authentication result to the output device 3. The authentication method by the authentication device 1 includes fingerprint authentication, iris authentication, face authentication, voice print authentication, vein authentication and the like using the above-mentioned biometric information. The functions and operations of the authentication device 1 described below are not different depending on the authentication method, and can be used for any biometric information and biometric authentication, without being limited to the aforementioned.

When the user makes an authentication request, the authentication device 1 acquires the biometric information a plurality of times and compares the biometric information with feature value master data of the registered biometric information. Acquiring the biometric information a plurality of times is a workaround for the possibility of data mismatch due to data differences caused by the behavior due to being a living body, that is, being alive. Moreover, it is also an auxiliary function for the uncertainty of the environmental conditions of reading when acquiring biometric information and the conditions of people inputting biometric information.

A specific example is the contact pressure of a finger with respect to a fingerprint biometric information reader (sensor). If the contact pressure is weak, data will be acquired only in the central part of the fingertip fingerprint, but if the contact pressure is weak, it is assumed data will be acquired not only in the central part of the fingertip fingerprint but also in the part close to the outer peripheral part. In this way, it is easily assumed that the data input via the input device 2 will be different each time just due to the fingertip pressure alone. In biometric authentication, spoofing taking advantage of the characteristic that there is no perfect match can be performed in feature point comparison based on biometric information. That is, in spoofing, it is assumed that, with respect to biometric information exploited by eavesdropping, the exploited biometric information data is used after being tampered. The authentication device 1 includes a function capable of dealing with such spoofing.

The authentication device 1 includes an acquisition unit 11, an extraction unit 12, a comparison unit 13, a determination unit 14, an output unit 15, master data 16, and a temporary storage unit 17. The master data 16 stores feature value master data. The feature value master data is data including feature values for authentication generated by using biometric information registered in advance by the user to be authenticated. The temporary storage unit 17 is a device for temporarily storing data generated for authentication in the authentication process in the authentication device 1.

The acquisition unit 11 controls the input device 2 and acquires biometric information from the user to be authenticated. In addition, the acquisition unit 11 acquires biometric information from the input device 2 two or more times before determining whether or not to provide authentication by the authentication device 1. Further, the acquisition unit 11 preferably controls the input device 2 so as to acquire the biometric information a plurality of times at random intervals.

The acquisition unit 11 controls the input device 2 and acquires biometric information as follows.

In the case of fingerprint authentication, the acquisition unit 11 acquires biometric information by the fingerprint of an individual user making contact with the fingerprint data acquisition device, which is the input device 2.

In the case of iris authentication, the acquisition unit 11 detects the approach of the eyes to the input device 2, which is an iris data reading device with a built-in camera in order to capture iris data, and acquires biometric information.

In the case of face recognition, the acquisition unit 11 causes the face to be displayed as a subject in front of the input device 2, which is a camera for performing face recognition. The acquisition unit 11 acquires the biometric information by image capture being performed after a certain period of time, or by the image capture button on a smartphone being pressed.

In the case of voiceprint authentication, the acquisition unit 11 causes a character string, words, or the like displayed on the authentication device 1 to be read aloud according to the displayed content. Then, the acquisition unit 11 acquires the biometric information by acquiring the voice with a microphone serving as the input device 2.

In the case of vein authentication, the acquisition unit 11 detects the approach of a person's wrist portion to the input device 2, which is a vein pattern reading device for reading human vein patterns, and acquires biometric information.

The extraction unit 12 extracts feature values needed for authentication from the biometric information acquired by the acquisition unit 11. The extraction unit 12 also performs a process of extracting a feature value from each of the plurality of pieces of biometric information acquired by the acquisition unit 11.

The comparison unit 13 acquires the feature value master data for authentication registered in the master data 16 from the master data 16, and compares the feature value extracted by the extraction unit 12 with the feature value master data. The comparison unit 13 also compares each of the feature values acquired a plurality of times by the extraction unit 12 with the feature value master data. Moreover, the comparison unit 13 performs a process of comparing the feature value of the biometric information with the feature value master data, and storing feature values that resulted in a mismatch in the temporary storage unit 17 for each piece of acquired biometric information.

The determination unit 14 determines whether or not to provide authentication by using the result of comparison between each feature value of the biometric information acquired a plurality of times and the feature value master data for authentication. In the determination by the determination unit 14, it is determined not to provide authentication when there is no difference in each of the feature values that resulted in a mismatch between each piece of acquired biometric information as a result of comparison between each feature value of the biometric information acquired multiple times and the feature value master data. As a result of comparison between each feature value of biometric information acquired multiple times and the feature value master data for authentication, when a matching feature value exceeds a predetermined standard, the determination unit 14 determines whether or not there is a difference in the feature values that resulted in a mismatch among each piece of the acquired biometric information.

The output unit 15 performs a process of outputting the determination result by the determination unit 14 to the output device 3.

Figure 2:
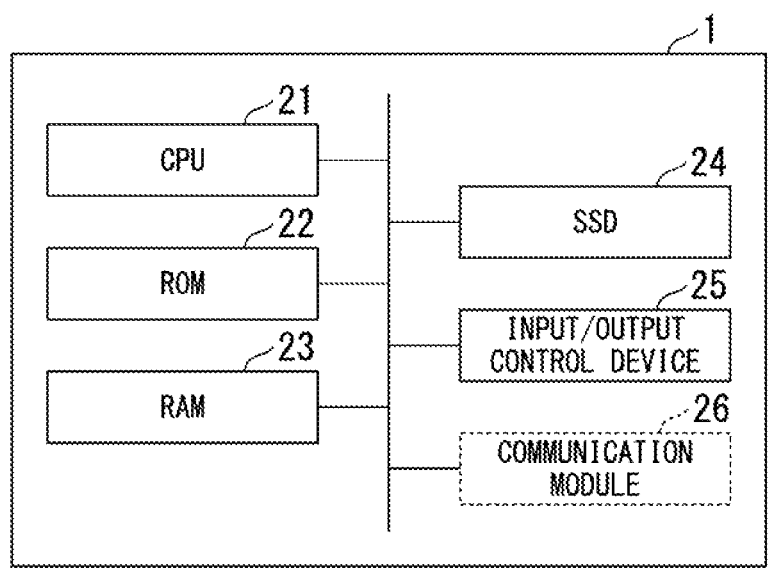
FIG. 2 is a diagram showing a hardware configuration of the authentication device according to the example embodiment of the present invention.

FIG. 2 is a diagram showing a hardware configuration of the authentication device 1 according to the example embodiment of the present invention. The authentication device 1 includes a CPU (Central Processing Unit) 21, a ROM (Read Only Memory) 22, a RAM (Random Access Memory) 23, an SSD (Solid State Drive) 24, and an input/output control device 25.

The CPU 21 realizes each function of the authentication device 1 by executing a program stored in a recording medium such as the ROM 22 or the SSD 24.

The SSD 24 also stores data and the like required to realize the function of the authentication device 1. The SSD 24 may be another non-volatile storage device, for example, an HDD (Hard Disk Drive), or may be configured by several different types of non-volatile storage devices.

The input/output control device 25 controls the input/output of the input device 2 and the output device 3.

Further, the authentication device 1 may include a communication module 26 when exchanging information via a network. The communication module 26 is used for network connection. The authentication device 1 may include any or all of a keyboard, mouse, and a touch panel device in addition to the input device 2 and the output device 3 described with reference to FIG. 1.

Figure 3:
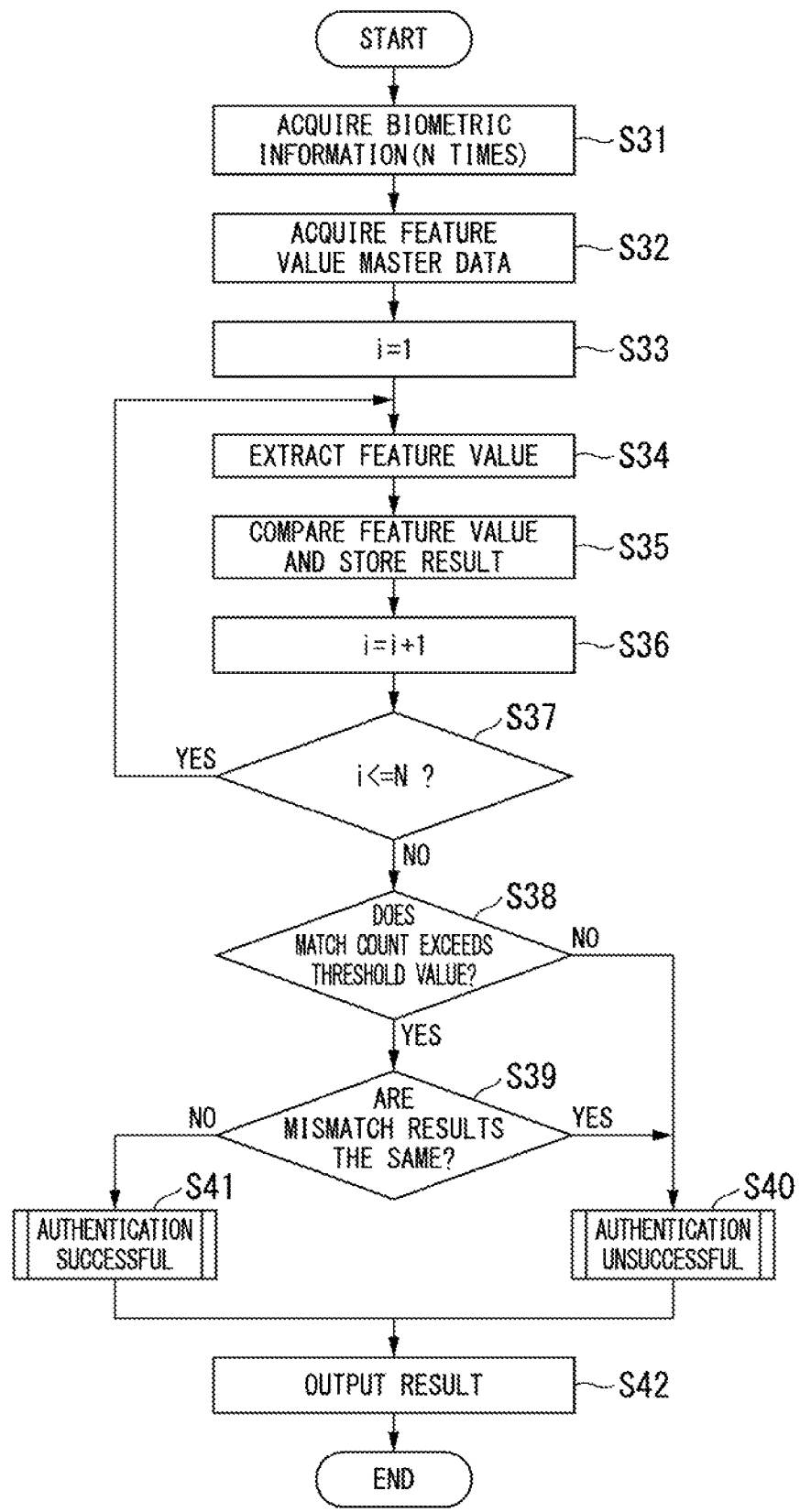
FIG. 3 is a diagram showing the operation of the authentication device according to the example embodiment of the present invention.

FIG. 3 is a diagram showing the operation of the authentication device 1 according to the example embodiment of the present invention. Hereinbelow, the operation of the authentication device 1 will be described with reference to FIG. 3.

Before the start of the authentication process by the authentication device 1, the user who uses the authentication device 1 causes the authentication device 1 to take in the biometric information in advance and registers master data relating to feature values of his/her biometric information. The biometric authentication feature value is stored in the master data 16 as the feature value master data.

A user who wants to receive a service by biometric authentication or wants to use the authentication device 1 performs an operation for inputting biometric information, and the authentication device 1 starts biometric authentication.

The acquisition unit 11 controls the input device 2 and acquires biometric information from the user who is the authentication target (Step S31). Here, the acquisition unit 11 acquires biometric information from the input device 2 two or more times. Moreover, the acquisition unit 11 controls the input device 2 so as to acquire the biometric information a plurality of times at random intervals. The biometric information differs depending on how the user uses the input device 2 and the surrounding environment. The reason of operating so as to perform acquisition multiple times at random intervals during the acquisition of biometric information serves is to make it easier to obtain appropriate biometric information, at the time of acquiring biometric information multiple times, when the true user registered in the master data 16 is the authentication target. The number of times in which biometric information is acquired by the acquisition unit 11 is set to "N" times (N being an integer of 2 or more). Further, the number of times "N" may be a predetermined value, or may be a value determined from a predetermined range at each authentication.

The comparison unit 13 acquires the feature value master data from the master data 16 as a preliminary preparation for comparison of the feature values of the biometric information (Step S32).

The comparison unit 13 initializes the flag "i" for counting the number of times in order to compare the feature values a plurality of times (Step S33). Here, "1" is set as the initial value for "i".

The extraction unit 12 extracts a feature value needed for authentication from the biometric information acquired by the acquisition unit 11 (Step S34). The extraction unit 12 performs a process of extracting the feature value from the biometric information acquired at the "i"-th time. The extraction unit 12 extracts the feature value according to a predetermined algorithm.

The comparison unit 13 compares the feature value extracted in Step S34 with the feature value master data extracted in Step S32 (Step S35). Moreover, the comparison unit 13 stores in the temporary storage unit 17 information regarding feature values that resulted in a mismatch as a result of the comparison between the extracted feature value and the feature value master data in Step S35 so as to be able to distinguish each acquired biometric information. For example, the comparison unit 13 performs a process of storing in the temporary storage unit 17 a feature value that resulted in a mismatch in association with the number of times indicated by the flag "i". Further, the comparison unit 13 stores feature values that resulted in a match in the comparison between the extracted feature values and the feature value master data in the temporary storage unit 17 in the same manner as feature values resulting in a mismatch.

When the "i"-th authentication is completed, the comparison unit 13 increments the flag "i" by one (Step S36). Moreover, the comparison unit 13 compares the flag "i" with "N" in order to determine whether the comparison of "N" times is completed (Step S37). When the value of the flag "i" is "N" times or less (Step S37: YES), the process returns to Step S34 for the comparison process of the feature values using the biometric information acquired at the "i"-th time. On the other hand, when the value of the flag "i" is not "N" times or less (Step S37: NO), the process proceeds to Step S38 for the next process.

The determination unit 14 performs a primary determination of authentication by using the result of comparison between each characteristic value of the biometric information acquired "N" times and the characteristic value master data for authentication (Step S38). The primary determination is performed using the result stored in the temporary storage unit 17 in Step S35. For example, in the primary determination, it is determined to be the person himself/herself, when, in the comparison of the feature value of N times in Step S35, the total number of matching feature values exceeds a predetermined threshold value, or the ratio of the matching feature values exceeds a predetermined threshold value. Alternatively, in the primary determination, it may be determined to be the person himself/herself by obtaining the result of M or more (M being an integer of N or less) authentications during N times of authentication based on the authentication result each time, using the criteria for authenticating as the person himself/herself in one determination.

As a result of the primary determination, when identification or determination of the user to be authenticated as the person himself/herself is not possible (Step S38: NO), the determination unit 14 determines the user to be authenticated as "authentication unsuccessful" (does not provide authentication) (Step S40).

As a result of the primary determination, when the user to be authenticated can be identified or determined as the person himself/herself (Step S38: YES), the determination unit 14 performs a secondary determination for the user to be authenticated (Step S39). The determination unit 14 performs the secondary determination based on whether or not there is a disagreement in the portion of the feature value that resulted in a mismatch as a result of the comparison in Step S35. That is, the secondary determination is performed based on whether or not a discrepancy is detected at the same position or the same feature value in the comparison of the feature value of N times. If no mismatch is detected in the secondary determination (Step S39: YES), the determination unit 14 determines that falsification data has been input, and determines that the user to be authenticated is "authentication unsuccessful" (does not provide authentication) (Step S40). On the other hand, when a mismatch is detected in the secondary determination (Step S39: NO), the determination unit 14 determines that falsification data has not been input, and determines that the user to be authenticated is "authentication successful" (provides authentication) (Step S41).

The output unit 15 performs a process of outputting the determination result by the determination unit 14 to the output device 3 (Step S42). By this output, the determination result of biometric authentication is provided to the device or service using the determination result directly or via the network.

As described above, as a result of comparing each feature value of the biometric information acquired a plurality of times with the feature value master data, the authentication device 1 determines not to provide authentication if there is no difference in each of the feature values that resulted in a mismatch. Therefore, when an eavesdropper or a malicious individual uses the biometric information exploited by eavesdropping to impersonate a legitimate user and request personal authentication from the authentication device, the authentication can be treated as unsuccessful (does not provide authentication). Moreover, even when falsified data utilizing the characteristic of inconsistency in biometric authentication is used, the authentication can be treated as unsuccessful (does not provide authentication). Therefore, it is possible to avert the use of the service or the device by a malicious person.

It is expected that various types of biometric authentication will be used as an alternative to the authentication method using ID and password, with fingerprint authentication, face authentication, and the like being used to unlock smartphones. However, in the unlikely event that biometric authentication is leaked, it is generally difficult to modify the master data because the person's living body is used. Therefore, while systematic measures are required when biometric authentication is leaked, the authentication device 1 described above enables systematic measures when biometric authentication is leaked.

FIG. 3 describes the acquisition unit 11 as performing the acquisition of biometric information of N times in Step S31, but the example embodiment is not limited thereto. For example, the acquisition of biometric information of N times may be performed at least before the determination in Step S39. For example, the acquisition of biometric information each time may be immediately before Step S34, and the return destination of the processing when "YES" in Step S37 may be the processing step for acquiring biometric information each time.

Further, the feature value master data for a plurality of people may be registered in the authentication device 1 so that not only one user but also a plurality of users can be authenticated. In this case, if the authentication device 1 determines that authentication can be performed with any of the feature value master data, the authentication is successful.

In the authentication device 1, the amount of data is reduced by extracting feature values from biometric information for biometric authentication. However, when a smartphone is used as the authentication device 1 and there are sufficient resources in terms of the specifications of the smartphone, the comparison may be performed using metadata. In this case, the metadata is also used for the master data.

In the authentication device 1, the acquisition unit 11, the extraction unit 12, the comparison unit 13, the determination unit 14, the output unit 15, the master data 16, and the temporary storage unit 17 are integrated. The example embodiment is not limited thereto, and the authentication device 1 may implement other functions other than the acquisition unit 11 in an external device such as a server through a network.

Further, only the acquisition unit 11 and the extraction unit 12 may be mounted on the authentication device 1, and other functions may be mounted on the external device to the server or the like through the network. In this case, since the data flowing through the network is only the biometric information data feature value, the amount of data can be reduced.

When there has been a change in biometric information without any evidence of eavesdropping or leakage other than spoofing detection by eavesdropping data, the authentication device 1 may have a function of prompting the re-creation of master data for authentication.

Although it has been described that, when a mismatch is detected at the same place and/or feature value, the feature value mismatch data of the biometric information is stored in the temporary storage unit 17, it may be a storage unit capable of storing for a certain period of time instead of the temporary storage unit 17 of the authentication device 1. For example, suppose a user uses biometric authentication once a day, and has always been successful in the use of a biometric authentication device. Then assume the user is determined to be unsuccessful in biometric authentication from a certain starting point in his/her life. By assuming a storage unit capable of storing for a certain period of time, it is possible to detect that a change has occurred in the biometric information of the user due to an injury or the like in such a case. By detecting the change in biometric information, the authentication device 1 can display information such as "re-creation of biometric authentication master data is recommended" on the display device, whereby the user can continue to use biometric authentication.

The function of the authentication device 1 can also be used for the use and permission of services by connecting to the Internet from a smartphone, purchasing behavior on an EC site or purchasing application, entry/exit management to buildings, and the like, access permission of confidential information data (locations), and the like.

Figure 4:
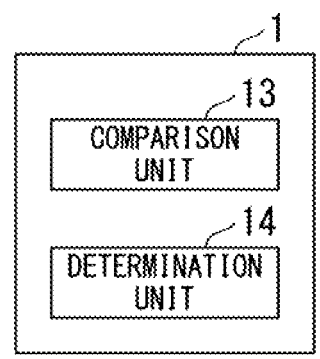
FIG. 4 is a diagram showing a configuration of the authentication device according to an example embodiment of the present invention.

FIG. 4 is a diagram showing a configuration of the authentication device 1 according to an example embodiment of the present invention. The authentication device 1 includes a comparison unit 13 and a determination unit 14.

The comparison unit 13 compares, with feature value master data for authentication, each feature value needed for authentication that has been extracted from a plurality of pieces of obtained biometric information.

The determination unit 14 determines not to authenticate when, as a result of comparison by the comparison unit 13, there is no difference in each of the feature values that resulted in a mismatch.

The above-described authentication device 1 has a computer system inside. The process of the authentication process described above is stored in a computer-readable recording medium in the form of a program, and the process is performed by the computer reading and executing this program. Here, the computer-readable recording medium means a magnetic disk, a magneto-optical disk, a CD-ROM, a DVD-ROM, a semiconductor memory, or the like. Further, this computer program may be distributed to a computer via a communication line, and the computer receiving the distribution may execute the program.

The above program may be for realizing some of the above-mentioned functions. Further, the program may be a so-called differential file (differential program) that can realize the above-mentioned functions in combination with a program already recorded in the computer system.

This application is based upon and claims the benefit of priority from Japanese patent application No. 2020-018847, filed Feb. 6, 2020, the disclosure of which is incorporated herein in its entirety by reference

INDUSTRIAL APPLICABILITY

The present invention may be applied to an authentication device, an authentication method, and a recording medium.

DESCRIPTION OF REFERENCE SYMBOLS

1: Authentication device
2: Input device
3: Output device
11: Acquisition unit
12: Extraction unit
13: Comparison unit
14: Determination unit
15: Output unit
16: Master data
17: Temporary storage unit

What is claimed is:

1. An authentication device comprising:
at least one memory configured to store instructions; and
at least one processor configured to execute the instructions to:
compare, with feature value master data for authentication, each of a plurality of feature values needed for authentication, the plurality of feature values respectively having been
extracted from a plurality of pieces of acquired biometric information;
determine whether there is a difference among a plurality of mismatches in a feature value between the feature value master data and each of the plurality of feature values;
and
determine not to provide authentication in a case where there is no difference among the plurality of mismatches,
wherein fraudulent authenticating by at least spoofing is prevented by determining not to provide authentication in the case where there is no difference among the plurality of mismatches.

2. The authentication device according to claim 1, wherein the at least one processor is configured to execute the instructions to:
store the plurality of mismatches; and
determine not to provide authentication in a case where there is no difference among the stored plurality of mismatches.

3. The authentication device according to claim 1, wherein the at least one processor is configured to execute the instructions to determine whether there is a difference among the plurality of mismatches in a case where a matching feature value exceeds a predetermined standard as the result of comparison between the feature value master data and each of the plurality of feature values.

4. The authentication device according to claim 1, wherein the at least one processor is configured to execute the instructions to:
acquire the biometric information a plurality of times at random intervals; and
compare, with the feature value master data, each feature value extracted from the biometric information acquired the plurality of times.

5. An authentication method executed by a computer, comprising:
comparing, with feature value master data for authentication, each of a plurality of feature values needed for authentication, the plurality of feature values respectively having been extracted from a plurality of pieces of acquired biometric information;
determining whether there is a difference among a plurality of mismatches in a feature value between the feature value master data and each of the plurality of feature values; and
determining not to provide authentication in a case where there is no difference among the plurality of mismatches,
wherein fraudulent authenticating by at least spoofing is prevented by determining not to provide authentication in the case where there is no difference among the plurality of mismatches.

6. The authentication method according to claim 5, further comprising:
storing the plurality of mismatches, and
the determining comprises determining not to provide authentication in a case where there is no difference among the stored plurality of mismatches.

7. The authentication method according to claim 5, wherein the determining comprises determining whether there is a difference among the plurality of mismatches in a case where a matching feature value exceeds a predetermined standard as the result of comparison between the feature value master data and each of the plurality of feature values.

8. The authentication method according to claim 5, further comprising:
acquiring the biometric information a plurality of times at random intervals,
wherein the comparing comprises comparing, with the feature value master data, each feature value extracted from the biometric information acquired the plurality of times.

9. A non-transitory recording medium that stores a program
for an authentication device that causes a computer to execute:
comparing, with feature value master data for authentication, each of a plurality of feature values needed for authentication, the plurality of feature values respectively having been extracted from a plurality of pieces of acquired biometric information;
determining whether there is a difference among a plurality of mismatches in a feature value between the feature value master data and each of the plurality of feature values; and
determining not to provide authentication in a case where there is no difference among the plurality of mismatches, wherein fraudulent authenticating by at least spoofing is prevented by determining not to provide authentication in the case where there is no difference among the plurality of mismatches.

10. The non-transitory recording medium according to claim 9,
wherein the program further causes the computer to execute storing the plurality of mismatches, and
the determining comprises determining not to provide authentication in a case where there is no difference among the stored plurality of mismatches.

11. The authentication device according to claim 1, further comprising:
an acquisition unit configured to acquire the biometric information by contact of a fingerprint, capturing an image of an iris, capturing an image of a face, acquiring a voice, or reading a vein pattern.

12. The authentication device according to claim 1,
wherein the plurality of mismatches comprise a first mismatch and a second mismatch, the first mismatch indicating a mismatch between the feature value master data and a first feature value among the plurality feature values, the second mismatch indicating a mismatch between the feature value master data and a second feature value among the plurality feature values, and
wherein the determining whether there is a difference comprises determining whether there is a difference between the first mismatch and the second mismatch.

* * * * *